(12) United States Patent
Takahashi et al.

(10) Patent No.: US 9,688,137 B2
(45) Date of Patent: Jun. 27, 2017

(54) LID DEVICE FOR CHARGING PORT

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Akira Takahashi, Toyokawa (JP); Shoichi Honda, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/925,482

(22) Filed: Oct. 28, 2015

(65) Prior Publication Data

US 2016/0121746 A1    May 5, 2016

(30) Foreign Application Priority Data

Oct. 29, 2014    (JP) .................................. 2014-220752

(51) Int. Cl.
*B60K 15/05* (2006.01)
*E05D 3/06* (2006.01)
(Continued)

(52) U.S. Cl.
CPC .......... *B60K 15/05* (2013.01); *B60L 11/1818* (2013.01); *E05B 77/34* (2013.01);
(Continued)

(58) Field of Classification Search
CPC ............ B60K 15/05; E05B 83/34; E05D 3/06
(Continued)

(56) References Cited

U.S. PATENT DOCUMENTS 4,776,486 A * 10/1988 Mizusawa .......... B60K 15/0406
220/375
9,381,820 B2 * 7/2016 Yamamaru ............ B60L 11/123
(Continued)

FOREIGN PATENT DOCUMENTS

FR      2888274 A1 *  1/2007  ............... E05D 3/06
JP      2009-171713 A   7/2009

OTHER PUBLICATIONS

English Translation of FR 2888274; retreived on Dec. 15, 2016 via PatentTranslate located www.epo.org.*

*Primary Examiner* — Jason S Daniels
(74) *Attorney, Agent, or Firm* — Birch, Stewart, Kolasch & Birch, LLP

(57) ABSTRACT

A charging lid device includes a lid that opens and closes a concave portion accommodating a charging inlet provided on a vehicle, and a support arm supporting the lid so that the lid is movable between a fully closing position and a fully opening position for closing and opening the concave portion. The support arm includes first and second swinging arms. One end side of the first swinging arm is attached inside the concave portion so as to swing. One end side of the second swinging arm is connected to the first swinging arm so as to swing and the other end side of the second swinging arm is attached to the lid so as to swing. The lid is arranged at a position displaced from the concave portion and along a surface of the vehicle when the lid is in the fully opening position.

15 Claims, 8 Drawing Sheets

(51) Int. Cl.
  *B60L 11/18*  (2006.01)
  *E05F 1/10*  (2006.01)
  *E05B 77/34*  (2014.01)
  *E05B 83/34*  (2014.01)
  *E05B 81/04*  (2014.01)

(52) U.S. Cl.
  CPC ............... *E05B 83/34* (2013.01); *E05D 3/06* (2013.01); *E05F 1/10* (2013.01); *E05B 81/04* (2013.01)

(58) Field of Classification Search
  USPC ..................................... 296/97.22; 220/86.2
  See application file for complete search history.

(56) References Cited

U.S. PATENT DOCUMENTS

| | | | |
|---|---|---|---|
| 2010/0270860 A1 | 10/2010 | Kamaga | |
| 2011/0140477 A1* | 6/2011 | Mihai | B60K 15/05 |
| | | | 296/97.22 |
| 2011/0285166 A1* | 11/2011 | Baba | E05D 11/1007 |
| | | | 296/97.22 |
| 2016/0087375 A1* | 3/2016 | Yoshizawa | B60K 1/04 |
| | | | 439/345 |

* cited by examiner

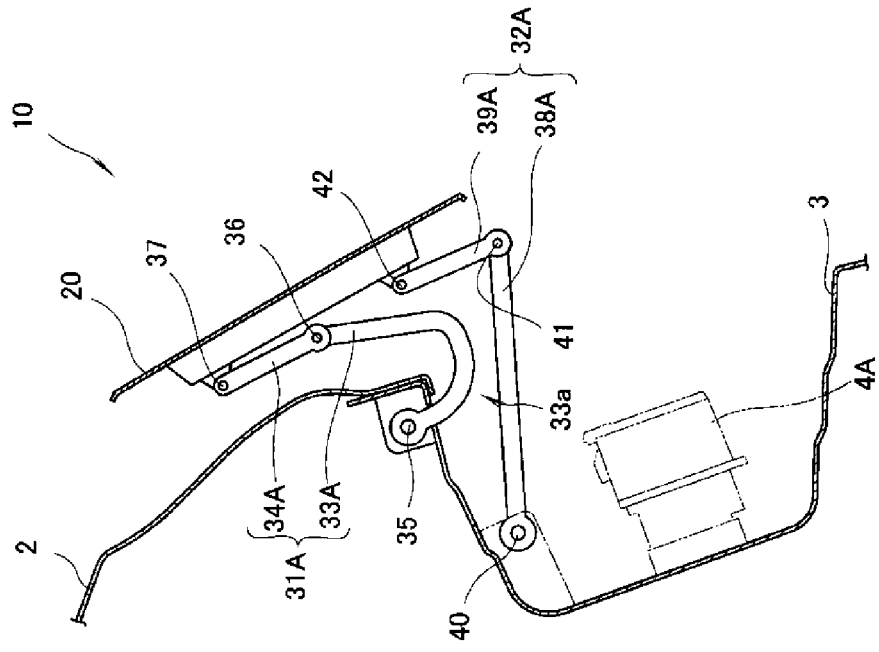
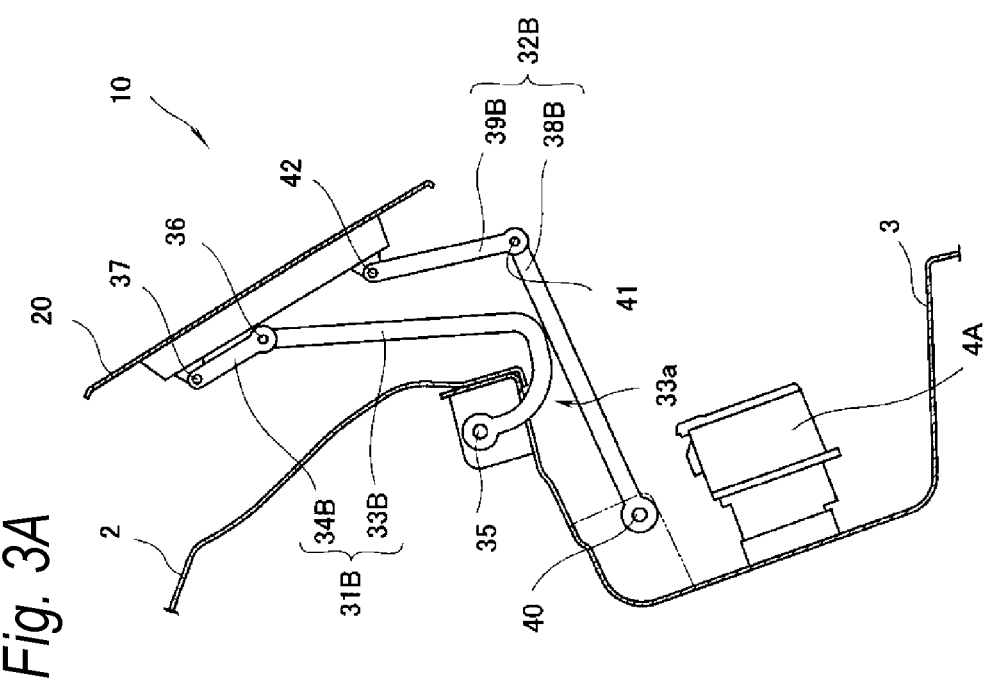

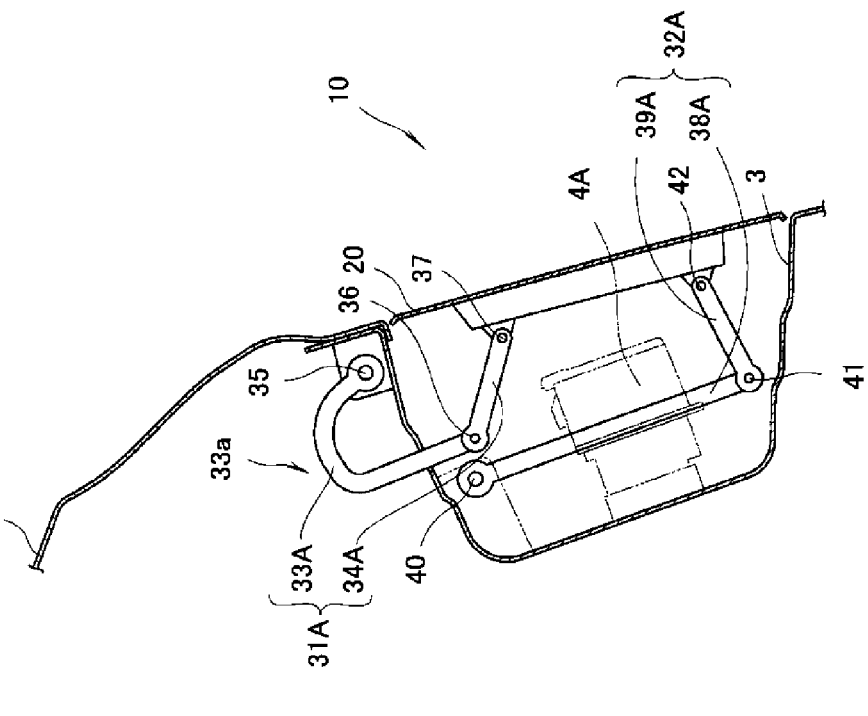
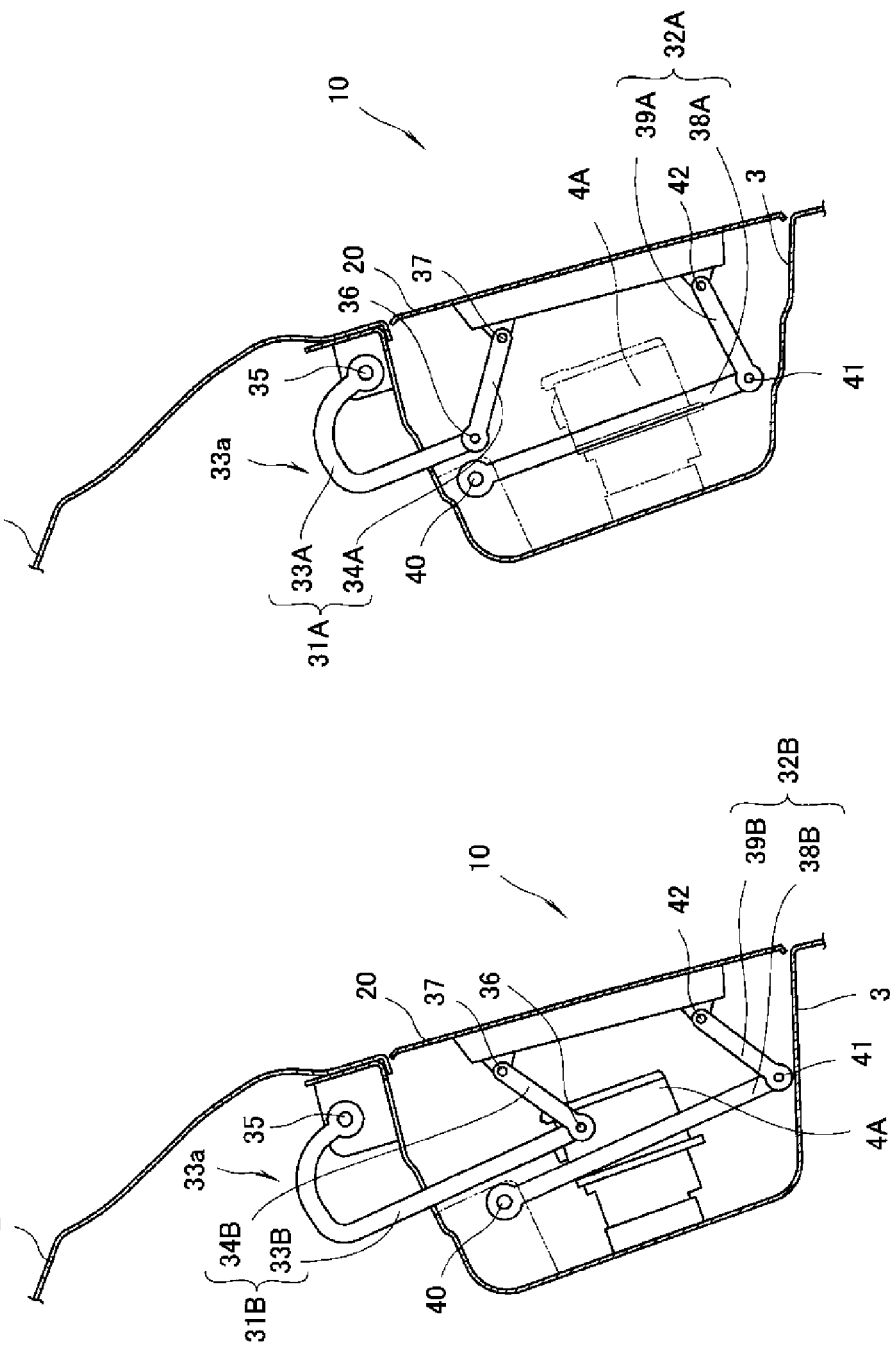

LID DEVICE FOR CHARGING PORT

BACKGROUND

The present invention relates to a lid device for opening and closing a charging port having a charging inlet to which a charging connector is connected.

In recent years, various electric vehicles travelling using an electric motor or various hybrid vehicles travelling using the electric motor and an engine in combination have been developed. The electric vehicle or the hybrid vehicle has a battery, and the electric motor is driven by power stored in the battery. The battery mounted on the electric vehicle or the hybrid vehicle is charged with the power supplied from charging facilities (household power source (commercial power source) or power source of charging-dedicated facilities) located outside the vehicles. The battery is charged by connecting a charging connector to an inlet.

A charging port having a charging inlet is configured to be openable and closeable by a lid. This lid is generally attached to a vehicle front side of the charging port so as to be swingable in a longitudinal direction of the vehicle (for example, refer to Patent Document 1).

[Patent Document 1] JP-A-2009-171713

SUMMARY

The present invention aims to provide a lid device for a charging port which can suppress a protrusion amount of a lid in a state where the charging port is open, and which can prevent rain or snow from permeating into the charging port in a charging state.

According to one advantageous aspect of the present invention, there is provided a charging lid device for a vehicle, comprising:

a lid configured to open and close a concave portion accommodating a charging inlet provided on the vehicle; and a support arm supporting the lid so that the lid is movable between a fully closing position for closing the concave portion fully and a fully opening position for opening the concave portion fully, wherein the support arm includes a first swinging arm and a second swinging arm, one end side of the first swinging arm is attached inside the concave portion so as to be able to swing, one end side of the second swinging arm is connected to the first swinging arm so as to be able to swing and the other end side of the second swinging arm is attached to the lid so as to be able to swing, and the lid is arranged at a position displaced from the concave portion and along a surface of the vehicle, when the lid is in the fully opening position.

The charging lid device may be configured such that: when the lid is in the fully opening position, the first swinging arm is arranged at an opening side in a moving direction of the lid in comparison to the charging inlet, and the second swinging arm is inclined toward the surface of the vehicle with respect to the first swinging arm around the one end of the second swinging arm.

The charging lid device may be configured such that: the support arm supports the lid so that the lid is movable in a vertical direction of the vehicle, and when the lid is in an intermediate position between the fully opening position and the fully closing position, the first swinging arm and the second swinging arm support the lid so that the lid opposes the charging inlet, and the lid is inclined so that a bottom end of the lid is more away from the concave portion than a top end of the lid.

The charging lid device may be configured such that: the support arm includes an upper arm which is attached to an upper portion of the lid, and a lower arm which is attached to a lower portion of the lid and is independent from the upper arm; and the upper arm and the lower arm respectively include the first swinging arm and the second swinging arm.

The charging lid device may be configured such that: the first swinging arm of the upper arm includes a plurality of engagement receiving portions which are formed along the first swinging arm and an engagement pin which is configured to be engaged with the engagement receiving portions; and the charging lid device further comprises a locking mechanism configured to engage the engagement pin with the engagement receiving portion to restrict an opening and closing operation of the lid.

BRIEF DESCRIPTION OF DRAWINGS

FIGS. 3A and 3B are sectional views illustrating the lid device according to the embodiment of the present invention.

FIGS. 4A and 4B are sectional views illustrating the lid device according to the embodiment of the present invention.

DETAILED DESCRIPTION OF EXEMPLIFIED EMBODIMENTS

In a case of a lid in the related art which is attached to a front side of a vehicle, when the lid is in an open state, the lid considerably protrudes sideways from the vehicle. Consequently, for example, when the vehicle is charged, there is a possibility of obstructing the passage of a pedestrian when the pedestrian passes by the vehicle. If a user neglects to close the lid after the charging is completed, there is a possibility that the pedestrian may touch the lid without noticing that the lid is open. In particular, when a charging port has a normal charging inlet and a quick charging inlet, an area of the lid increases relatively. That is, the area of the lid increases relatively, and a protrusion amount of the lid which protrudes sideways further increases. Consequently, the lid is more likely to obstruct the passage of the pedestrian.

In a case of the lid device having a structure in the related art, the charging port is considerably exposed in a state where the lid is open. For this reason, the charging port or a charging connector gets dirty easily due to rain or snow during the charging. Moreover, a problem may arise in that the charging port or the charging connector is frozen. For example, when a user performs normal charging using a household power source, the user often neglects the charging for several hours in a state where the charging connector is connected to the normal charging inlet (charging state). Consequently, the charging port or the charging connector is likely to be dirty or frozen.

The present invention is made in view of these circumstances, and an object thereof is to provide a lid device for a charging port which can suppress a protrusion amount of a lid in a state where the charging port is open, and which can prevent rain or snow from permeating into the charging port in a charging state.

Hereinafter, an embodiment of the present invention will be described in detail with reference to FIGS. 1 to 8.

Figure 1:
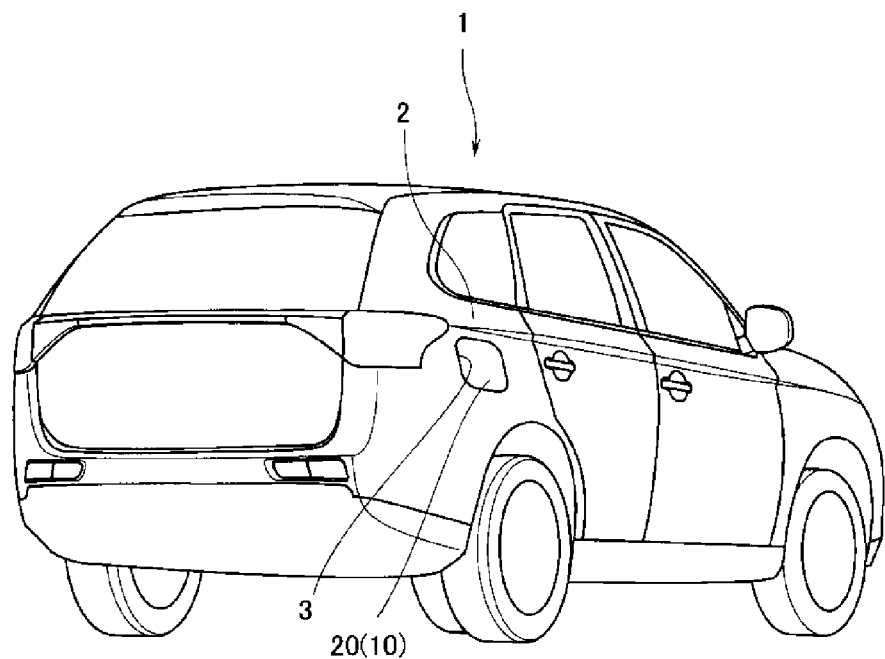
FIG. 1 is an external view illustrating an example of a vehicle including a lid device for opening and closing a charging port.
Figure 2:
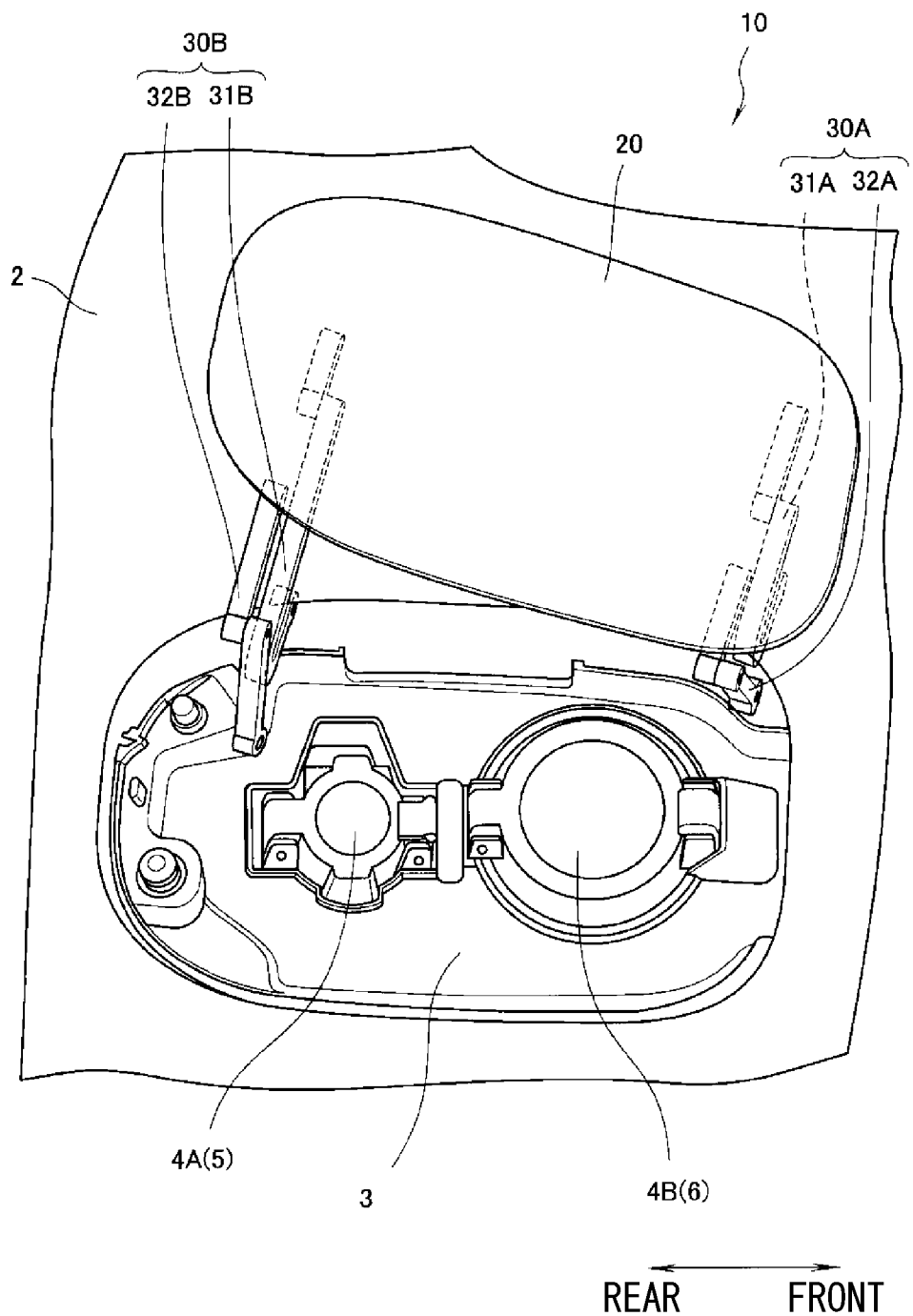
FIG. 2 is a schematic view illustrating the lid device according to an embodiment of the present invention.
Figure 5:
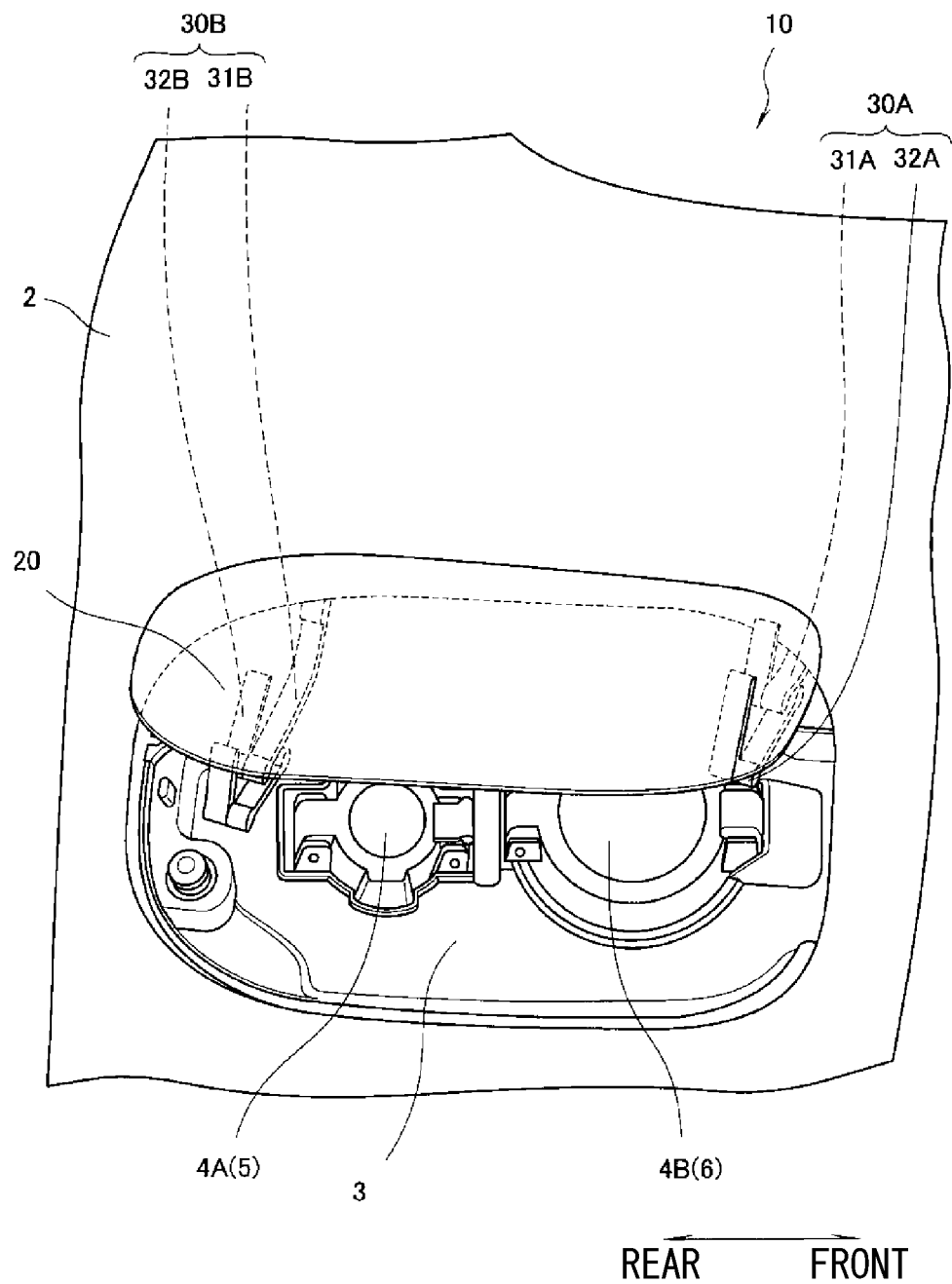
FIG. 5 is a schematic view illustrating the lid device according to the embodiment of the present invention.
Figure 6:
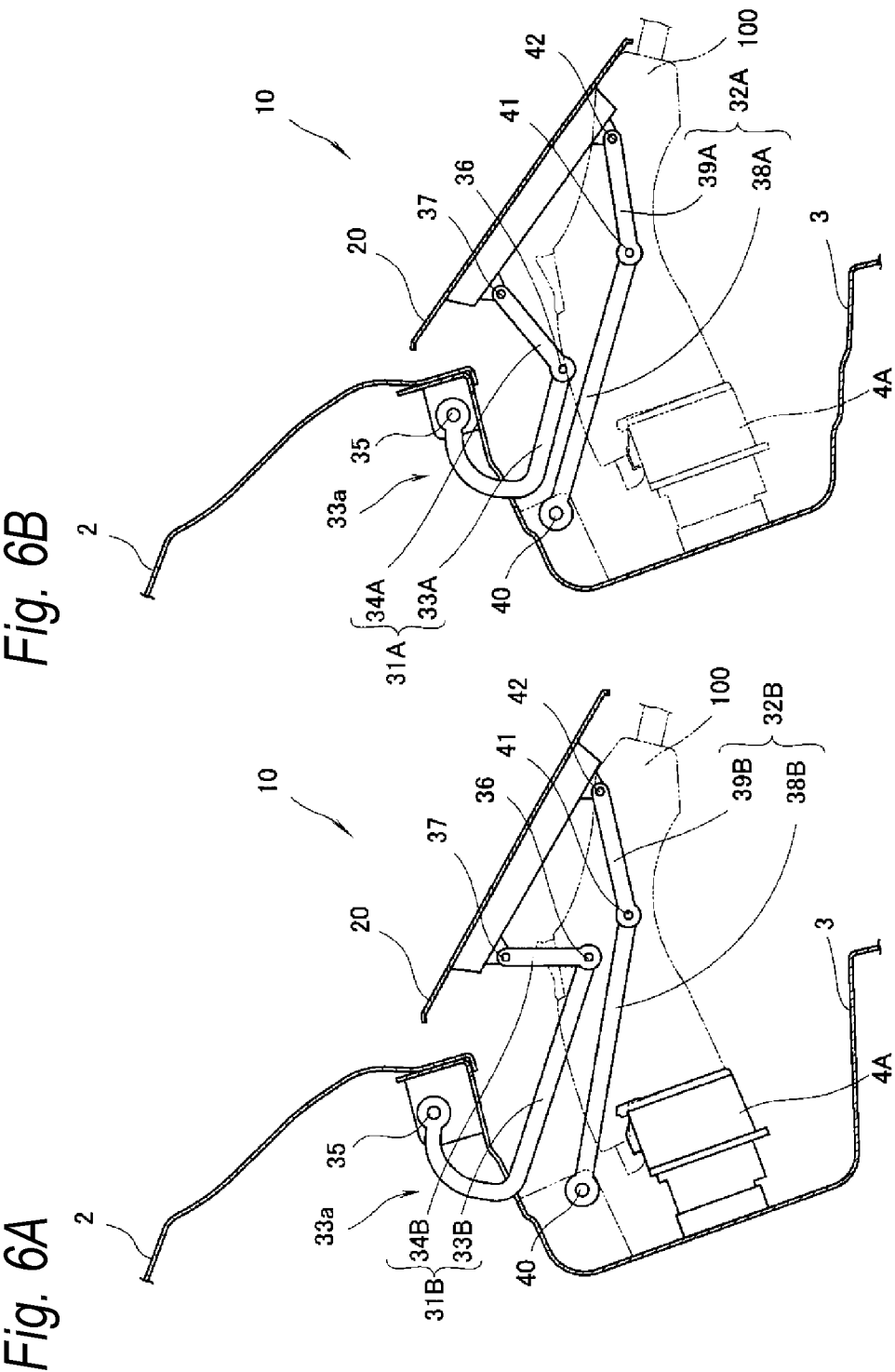
FIGS. 6A and 6B are sectional views illustrating the lid device according to the embodiment of the present invention.
Figure 7:
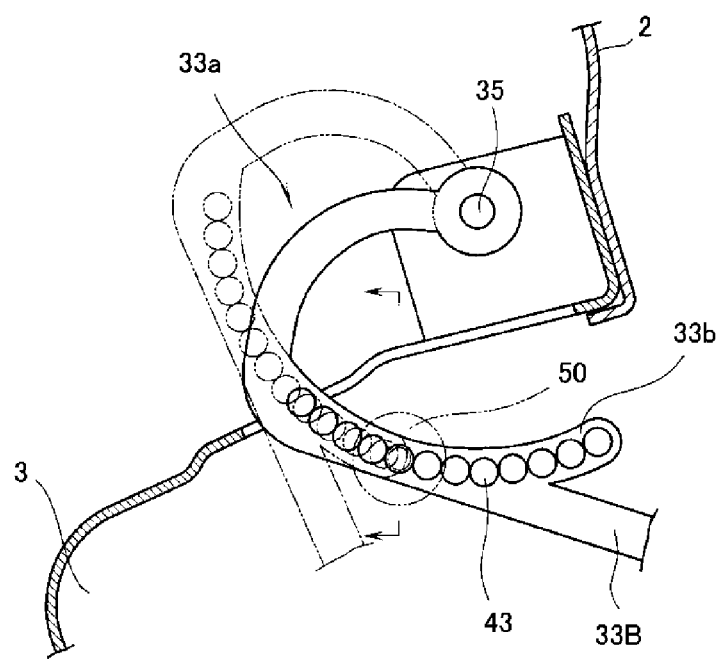
FIG. 7 is a view for describing a locking mechanism of the lid device according to the embodiment of the present invention.
Figure 8A:
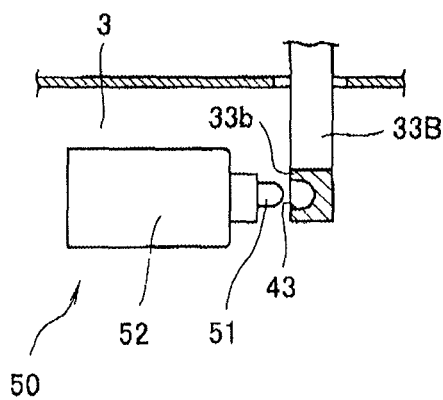
FIGS. 8A and 8B are views for describing an operation of an engagement pin configuring the locking mechanism.
Figure 8B:
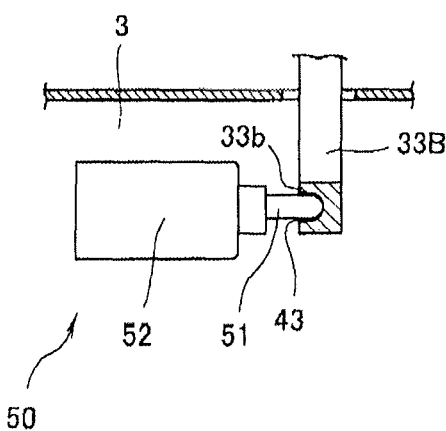

FIG. 1 is an external view illustrating an example of a vehicle including the lid device for opening and closing the charging port. FIG. 2 is a schematic view illustrating the lid device according to the present invention, and is a view illustrating a state where a lid is located at a fully opening position. FIGS. 3A and 3B are sectional views illustrating the state where the lid is located at the fully opening position. FIGS. 4A and 4B are sectional views illustrating a state where the lid is located at a fully closed state. FIG. 5 is a schematic view illustrating a state where the lid is located at an intermediate position. FIGS. 6A and 6B are sectional views illustrating the state where the lid is located at the intermediate position. FIGS. 3A, 4A and 6A illustrates a portion corresponding to a support arm on a rear side of a vehicle, and FIGS. 3B, 4B and 6B illustrates a portion corresponding to a support arm on a front side of the vehicle. FIG. 7 is a view for describing a locking mechanism. FIGS. 8A and 8B are views for describing an operation of an engagement pin configuring the locking mechanism.

A vehicle 1 according to the present embodiment is an electric motor vehicle including a traction motor driven by power of a battery (power storage device). As illustrated in FIGS. 1 and 2, an outer panel 2 of the vehicle 1 has a charging port 3. A position of the charging port 3 is not particularly limited. According to the present embodiment, the charging port 3 is disposed in a vehicle rear side portion of the vehicle 1. A charging inlet 4 to which a charging connector (not illustrated) is connected is disposed inside the charging port 3. According to the present embodiment, a normal charging inlet 4A and a quick charging inlet 4B are arrayed parallel to each other inside the charging port 3 (refer to FIG. 2).

A normal charging connector (charging connector) leading to a household power source (outlet) is connected to the normal charging inlet 4A. A quick charging connector (charging connector) of quick charging equipment installed in a parking lot of commercial facilities is connected to the quick charging inlet 4B. The battery is charged with power supplied from the normal charging connector or the quick charging connector.

The normal charging inlet 4A is plugged with a cap 5 when not in use. When the battery is charged, the cap 5 is detached therefrom, and the normal charging connector is connected to the normal charging inlet 4A. Similarly, the quick charging inlet 4B is also plugged with a cap 6 when not in use.

A lid device 10 is disposed in the charging port 3, and the lid device 10 enables the charging port 3 to be open and closed. That is, a lid 20 is disposed so as to be openable and closeable in an opening portion of the charging port 3.

The present invention adopts a characterized configuration of the lid device 10 which opens and closes the charging port 3. The lid device 10 according to the present embodiment includes the lid 20 which is disposed in the opening portion of the charging port 3, and support arms 30 which support the lid 20 so as to be movable in a vertical direction of the vehicle 1 between a fully closing position for closing the charging port 3 and a fully opening position for opening the charging port 3. That is, a configuration of the lid device 10 is adopted in which the charging port 3 is openable and closeable by moving the lid 20 in the vertical direction of the vehicle 1.

According to the present embodiment, the support arms 30 are respectively attached to the vicinity of both end portions of the lid 20 in a longitudinal direction of the vehicle 1. Specifically, the support arm 30 includes a first support arm 30A which is attached to the lid 20 in the vicinity of a front side end portion of the vehicle 1, and a second support arm 30B which is attached to the lid 20 in the vicinity of a rear side end portion of the vehicle 1. The first support arm 30A includes an upper arm 31A which is connected to an upper portion side of the lid 20, and a lower arm 32A which is connected to a lower portion side of the lid 20. Similarly, the second support arm 30B includes an upper arm 31B and a lower arm 32B. The upper arms 31A and 31B and the lower arms 32A and 32B are disposed independently without being connected to each other.

The first swinging arm 30A includes a plate shaped member.

Furthermore, the upper arms 31A and 31B and the lower arms 32A and 32B are respectively configured to include multiple arm members. According to the present embodiment, as illustrated in FIGS. 4A and 4B, the upper arms 31A and 31B are configured to include a first upper arm 33 (33A and 33B) which is a first swinging arm, and a second upper arm 34 (34A and 34B) which is a second swinging arm. The first upper arm 33 is pivotably attached to the upper portion of the charging port 3 by a connection pin 35. The second upper arm 34 is pivotably connected to a distal end portion (the other end portion) of the first upper arm 33 by a connection pin 36. A distal end portion (the other end portion) of the second upper arm 34 is pivotably attached to an upper portion of the lid 20 by a connection pin 37.

Similarly to the upper arms 31A and 31B, the lower arm 32 is configured to include a first lower arm 38 (38A and 38B) which is a first swinging arm, and a second lower arm 39 (39A and 39B) which is a second swinging arm. One end portion of the first lower arm 38 is pivotably attached to the upper portion inside the charging port 3 of the vehicle 1 by a connection pin 40. The second lower arm 39 is pivotably connected to a distal end portion (the other end portion) of the first lower arm 38 by a connection pin 41. A distal end portion (the other end portion) of the second lower arm 39 is pivotably attached to a lower portion of the lid 20 by a connection pin 42.

As described above, in the lid device 10 according to the present embodiment, for example, the lid 20 is supported by the support arm 30 including two arm members which are connected by the connection pins as in the first upper arm 33 and the second upper arm 34.

In this manner, the lid 20 is movable along a surface of a vehicle body of the vehicle 1 from the fully closing position for closing the charging port 3 to the fully opening position for opening the charging port 3, which is located above the opening of the charging port 3. Specifically, in a state where the lid 20 is held substantially parallel to the surface of the vehicle body of the vehicle 1, the lid 20 can be moved upward from the fully closing position illustrated in FIGS. 4A and 4B to the fully opening position illustrated in FIGS. 3A and 3B.

When the lid 20 is in the fully opening position, the other end of the first swinging arm 30A, which is opposite to the one end thereof, is arranged at an opening side in a moving direction of the lid 20 with respect to an axis of the charging inlet 4A, 4B, and the second swinging arm 30B is inclined toward the surface of the vehicle 1 with respect to the first swinging arm 30A around the one end of the second swinging arm 30B. Accordingly, the lid 20 can be placed along the surface of the vehicle 1 when the lid 20 is in the fully opening position.

Then, the lid 20 is moved to the fully opening position in a state where the lid 20 is held substantially parallel to the surface of the vehicle body of the vehicle 1. That is, the lid 20 is held substantially parallel to the surface of the vehicle body of the vehicle 1 at the fully opening position. In this manner, it is possible to minimize a protrusion amount of the lid 20 protruding from the surface of the vehicle body. For example, it is possible to further minimize the protrusion amount of the lid 20, compared to a structure in the related art which opens the charging port by swinging the lid in the longitudinal direction of the vehicle. Therefore, even in a state where the lid 20 is open during the charging, the lid 20 is less likely to obstruct the passage of a pedestrian who passes by the vehicle 1.

Incidentally, one end side (vehicle side) of the first upper arm 33 according to the present embodiment has a bent portion 33a formed in a substantially U-shape in a side view (refer to FIGS. 3 and 4). One end portion of the first upper arm 33 is attached to a portion above the charging port 3. Accordingly, if the first upper arm is formed in a linear shape, when the lid is vertically moved so as to open and close the charging port 3, the first upper arm interferes with the outer panel 2 of the vehicle 1. Therefore, the first upper arm 33 is allowed to have the bent portion 33a so that the first upper arm 33 does not interfere with the outer panel 2 of the vehicle 1 when the lid 20 is vertically moved so as to open and close the charging port 3. That is, the bent portion 33a is formed in a shape in which the first upper arm 33 does not interfere with the outer panel 2 of the vehicle 1 when the charging port 3 is open and closed.

According to the present embodiment, as illustrated in FIG. 3A, the first lower arm 38B comes into contact with the bent portion 33a of the first upper arm 33 at the fully opening position. In this manner, the upward movement of the lid 20 is restricted.

According to the present embodiment, the respective support arms 30 (first support arm 30A and second support arm 30B) is disposed so as to tilt to the front side of the vehicle 1 at a predetermined angle from the vertical direction (perpendicular direction) of the vehicle. Furthermore, the length of the second support arm 30B on the rear side of the vehicle 1 is longer than the length of the first support arm 30A on the front side of the vehicle 1.

A pair of the support arms 30 are provided separately from each other in the front-rear direction of the vehicle 1. A length of rear side one of the support arms 30 from the one end of the first swinging arm 30A to the other end of the swinging arm 30B via the one end of the second swinging arm 30B is longer than a length of front side one of the support arms 30 from the one end of the first swinging arm 30A to the other end of the swinging arm 30B via the one end of the second swinging arm 30B.

Therefore, opening and closing trajectories obtained when the lid 20 is moved from the fully closing position to the fully opening position, that is, opening and closing trajectories of the lid 20 in a side view (refer to FIG. 2) of the vehicle 1 show an arc shape which has the center on the further front side of the vehicle from the lid 20. Accordingly, although the lid 20 located at the fully opening position is substantially parallel to the surface of the vehicle body (outer panel 2) of the vehicle 1 as described above, the surface of the lid 20 is in a state of facing the slightly forward side of the vehicle 1. In this manner, when a pedestrian passes by the vehicle 1 from the front side of the vehicle 1, even if the pedestrian touches the lid 20, the pedestrian just touches the surface of the lid 20 without any damage to the pedestrian. A problem is less likely to arise in that the pedestrian is not caught on an edge portion of the lid 20. Accordingly, it is possible to suppress damage to the pedestrian.

The lid 20 is further pivotally movable in the vertical direction of the vehicle 1 at an intermediate position between the fully closing position (refer to FIGS. 3A and 3B) and the fully opening position (refer to FIGS. 4A and 4B). Specifically, in a state where the lid 20 is substantially parallel to the surface of the vehicle body (outer panel 2) of the vehicle 1, the lid 20 can be rotated in a manner of moving the lower end portion of the lid 20 in a direction away from the vehicle 1. For example, when the lid 20 is moved downward from the fully opening position of the lid 20, the lid 20 is rotated as illustrated in FIGS. 5 and 6. In this manner, the lid 20 can be brought into a half-open state in which the lower end side of the lid 20 tilts in a direction away from the surface of the vehicle body of the vehicle 1.

Therefore, for example, in a state where the lid 20 is located at the fully opening position as illustrated in FIGS. 3A and 3B, the normal charging connector is connected to the normal charging inlet 4A. Thereafter, while the lid 20 is rotated in the direction in which the lower end portion of the lid 20 is away from the surface of the vehicle body, the lid 20 is moved downward to the intermediate position where the lower end portion of the lid 20 comes into contact with the normal charging connector 100 (refer to FIGS. 6A and 6B). In this manner, the charging port 3 or the upper portion of the normal charging connector 100 (refer to FIGS. 6A and 6B) connected to the normal charging inlet 4A can be covered with and protected by the lid 20. For example, even if there is rain or snow during the charging, the lid 20 prevents the rain or the snow from adhering to the charging port 3 or the normal charging connector 100. Therefore, it is possible to prevent the charging port or the charging connector from being dirty or frozen. As a matter of course, even when the quick charging connector is connected to the quick charging inlet 4B, the same advantageous effect can be obtained.

The support arm 30 supports the lid 20 so that the lid 20 is movable in the vertical direction of the vehicle 1. When the lid 20 is in the intermediate position between the fully opening position and the fully closing position, the first swinging arm 30A and the second swinging arm 30B support the lid 20 so that the lid 20 opposes the charging inlet 4A, 4B, and the lid 20 is inclined so that a bottom end of the lid 20 is more away from the concave portion than a top end of the lid 20.

When the lid 20 moves from the fully closing position to the fully opening position, the first swinging arm 30A and the second swinging arm 30B are displaced away from the concave portion around the one end of the first swinging arm 30A, and the second swinging arm 30B swings toward the first swinging arm 30B around the one end of the second swinging arm 30B, so that the lid 20 is placed along the vehicle body.

The lid device 10 may further include a locking mechanism 50 which restricts the opening and closing operations of the lid 20 located at the intermediate position during the charging, and which locks the lid 20 into a half-open state for covering the charging connector (normal charging connector and quick charging connector). The locking mechanism 50 is configured to lock the lid 20 at the intermediate position so as to restrain the charging connector from moving in a direction in which the charging connector is pulled out by the lid. FIG. 7 is a schematic view illustrating an example of a lid device including the locking mechanism 50. FIGS. 8A and 8B are views for describing an operation of an engagement pin configuring the locking mechanism.

As illustrated in FIGS. 7 and 8, according to this example, an engagement surface portion 33b with which the locking mechanism 50 engages is disposed on a side surface of a portion on the second upper arm 34B side from the bent portion 33a of the first upper arm 33B. The engagement surface portion 33b is provided on the plate shaped member of the first swinging arm 30A. The engagement surface portion 33b is formed in an arch shape formed around the connection pin 35 so as to be equidistant from the connection pin 35 which is a swing center of the first upper arm 33B. Then, multiple hole portions 43 are formed parallel to each other in the engagement surface portion 33b so as to extend along the arch shape of the engagement surface portion 33b. That is, the multiple hole portions 43 are arrayed parallel to each other in an arc shape extending along the trajectory of the first upper arm 33B when the lid 20 is open and closed. Although an interval between the hole portions 43 is not particularly limited, it is preferable to array the hole portion 43 as close as possible.

The locking mechanism 50 is configured to include an engagement pin 51 which engages with the hole portion 43 disposed in the engagement surface portion 33b, and an actuator device (drive device) 52 which moves the engagement pin 51 in a direction away from or close to the hole portion 43.

For example, the locking mechanism 50 is arranged at the intermediate position (refer to FIGS. 6A and 6B) where the lid 20 is brought into the half-open state so that the engagement pin 51 faces the hole portion 43 of the engagement surface portion 33b. In other words, the hole portion 43 is formed in the engagement surface portion 33b of the first upper arm 33B so as to face the engagement pin 51 of the locking mechanism 50 when the lid 20 is located at the intermediate position (half-open state).

Then, as illustrated in FIG. 8A, the engagement pin 51 is normally (when being disengaged) held at a position where the distal end is away from the first upper arm 33B. For example, if an engagement instruction is received by operating a switch disposed inside the vehicle, the locking mechanism 50 drives the actuator device 52. As illustrated in FIG. 8B, the locking mechanism 50 causes the engagement pin 51 to move forward so as to engage with the hole portion 43. In this manner, the operation of the first upper arm 33B is restricted. That is, the opening and closing operations of the lid 20 are restricted (when being engaged).

For example, in a state where the normal charging connector 100 is connected as illustrated in FIGS. 6A and 6B, if the lid 20 is locked at the intermediate position by the locking mechanism 50, the normal charging connector 100 is restrained from moving in a direction in which the normal charging connector 100 is pulled out by the lid 20. That is, the normal charging connector 100 is inhibited from being pulled out. Therefore, the normal charging connector 100 is not inadvertently pulled out during the charging. In addition, it is possible to prevent the normal charging connector 100 from being pulled out due to mischief. Accordingly, an advantageous effect can also be obtained in terms of security. As a matter of course, even when the quick charging connector is connected to the quick charging inlet 4B, the same advantageous effect can be obtained.

According to the present embodiment, as described above, the multiple hole portions 43 are disposed close to each other in the engagement surface portion 33b. Therefore, when being engaged, the engagement pin 51 is enabled to engage with any one of the hole portions 43 without very accurately aligning a specific hole portion 43 and the engagement pin 51 with each other. Depending on a shape or a size of the charging connector (normal charging connector and quick charging connector), a position or a tilting angle of the lid 20 is changed at the intermediate position. However, it is possible to select the hole portion 43 with which the engagement pin 51 properly engages in accordance with the change.

According to the present embodiment, not only in a state where the lid 20 is located at the intermediate position, but also in a state where the lid 20 is located at the fully closing position as illustrated by a virtual line in FIG. 7, the engagement surface portion 33b having the hole portion 43 formed therein is present at a position of facing the engagement pin 51. That is, the engagement surface portion 33b of the first upper arm 33B is formed with a predetermined length so that the hole portion 43 is present at the position of facing the engagement pin 51, even in a state where the lid 20 is located at the fully closing position.

Therefore, even in a state where the lid 20 is located at the fully closing position, the locking mechanism 50 can restrict (lock) the opening and closing operations of the lid 20.

The locking mechanism 50 may be operated by operating the switch disposed inside the vehicle as described above. For example, the locking mechanism 50 may be operated in conjunction with a door lock of the vehicle 1.

Hitherto, the embodiment of the present invention has been described. However, as a matter of course, the present invention is not limited to the above-described embodiment.

According to the lid device of the present invention, the lid can be moved upward from the charging port in a state where the lid is substantially parallel to the surface of the vehicle body. Therefore, in a state where the charging port is open, the protrusion amount of the lid is minimized. In addition, the lid is pivotally movable in the vertical direction of the vehicle. Accordingly, the lid can be arranged above the charging port so as to cover the charging connector during the charging. In this manner, it is possible to effectively suppress a problem that the charging port or the charging connector may be dirty or frozen.

What is claimed is:

1. A charging lid device for a vehicle, comprising:
   a lid configured to open and close a concave portion accommodating a charging inlet provided on the vehicle; and
   a support arm supporting the lid so that the lid is movable between a fully closing position for closing the concave portion fully and a fully opening position for opening the concave portion fully,
   wherein the support arm includes a first swinging arm and a second swinging arm,
   one end side of the first swinging arm is attached inside the concave portion so as to be able to swing,
   one end side of the second swinging arm is connected to the first swinging arm so as to be able to swing about the first swinging arm and another end side of the second swinging arm is attached to the lid so as to be able to swing about the lid, and the lid is arranged at a position displaced from the concave portion and extends parallel to a surface of the vehicle, when the lid is in the fully opening position.

2. The charging lid device according to claim 1, wherein when the lid is in the fully opening position, the first swinging arm is arranged at an opening side in a moving direction of the lid in comparison to the charging inlet, and the second swinging arm is inclined toward the surface of the vehicle with respect to the first swinging arm around the one end of the second swinging arm.

3. The charging lid device according to claim 2, wherein the support arm supports the lid so that the lid is movable in a vertical direction of the vehicle, and
when the lid is in an intermediate position between the fully opening position and the fully closing position, the first swinging arm and the second swinging arm support the lid so that the lid opposes the charging inlet, and the lid is inclined so that a bottom end of the lid is more away from the concave portion than a top end of the lid.

4. The charging lid device according to claim 3, wherein the support arm includes an upper arm which is attached to an upper portion of the lid, and a lower arm which is attached to a lower portion of the lid and is independent from the upper arm, and
the upper arm and the lower arm respectively include the first swinging arm and the second swinging arm.

5. The charging lid device according to claim 4, wherein the first swinging arm of the upper arm includes a plurality of engagement receiving portions which are formed along the first swinging arm and an engagement pin which is configured to be engaged with the engagement receiving portions, and
the charging lid device further comprises a locking mechanism configured to engage the engagement pin with the engagement receiving portion to restrict an opening and closing operation of the lid.

6. The charging lid device according to claim 3, wherein the first swinging arm of the upper arm includes a plurality of engagement receiving portions which are formed along the first swinging arm and an engagement pin which is configured to be engaged with the engagement receiving portions, and
the charging lid device further comprises a locking mechanism configured to engage the engagement pin with the engagement receiving portion to restrict an opening and closing operation of the lid.

7. The charging lid device according to claim 2, wherein the support arm includes an upper arm which is attached to an upper portion of the lid, and a lower arm which is attached to a lower portion of the lid and is independent from the upper arm, and
the upper arm and the lower arm respectively include the first swinging arm and the second swinging arm.

8. The charging lid device according to claim 7, wherein the first swinging arm of the upper arm includes a plurality of engagement receiving portions which are formed along the first swinging arm and an engagement pin which is configured to be engaged with the engagement receiving portions, and
the charging lid device further comprises a locking mechanism configured to engage the engagement pin with the engagement receiving portion to restrict an opening and closing operation of the lid.

9. The charging lid device according to claim 2, wherein the first swinging arm of the upper arm includes a plurality of engagement receiving portions which are formed along the first swinging arm and an engagement pin which is configured to be engaged with the engagement receiving portions, and
the charging lid device further comprises a locking mechanism configured to engage the engagement pin with the engagement receiving portion to restrict an opening and closing operation of the lid.

10. The charging lid device according to claim 1, wherein the support arm supports the lid so that the lid is movable in a vertical direction of the vehicle, and
when the lid is in an intermediate position between the fully opening position and the fully closing position, the first swinging arm and the second swinging arm support the lid so that the lid opposes the charging inlet, and the lid is inclined so that a bottom end of the lid is more away from the concave portion than a top end of the lid.

11. The charging lid device according to claim 10, wherein
the support arm includes an upper arm which is attached to an upper portion of the lid, and a lower arm which is attached to a lower portion of the lid and is independent from the upper arm, and
the upper arm and the lower arm respectively include the first swinging arm and the second swinging arm.

12. The charging lid device, according to claim 10, wherein
the first swinging arm of the upper arm includes a plurality of engagement receiving portions which are formed along the first swinging arm and an engagement pin which is configured to be engaged with the engagement receiving portions, and
the charging lid device further comprises a locking mechanism configured to engage the engagement pin with the engagement receiving portion to restrict an opening and closing operation of the lid.

13. The charging lid device according to claim 1, wherein the support arm includes an upper arm which is attached to an upper portion of the lid, and a lower arm which is attached to a lower portion of the lid and is independent from the upper arm, and
the upper arm and the lower arm respectively include the first swinging arm and the second swinging arm.

14. The charging lid device according to claim 13, wherein
the first swinging arm of the upper arm includes a plurality of engagement receiving portions which are formed along the first swinging arm and an engagement pin which is configured to be engaged with the engagement receiving portions, and
the charging lid device further comprises a locking mechanism configured to engage the engagement pin with the engagement receiving portion to restrict an opening and closing operation of the lid.

15. A charging lid device for a vehicle, comprising:
a lid configured to open and close a concave portion accommodating a charging inlet provided on the vehicle; and
a support arm supporting the lid so that the lid is movable between a fully closing position for closing the concave portion fully and a fully opening position for opening the concave portion fully,
wherein the support arm includes a first swinging arm and a second swinging arm, one end side of the first swinging arm is attached inside the concave portion so as to be able to swing, one end side of the second swinging arm is connected to the first swinging arm so as to be able to swing and another end side of the second swinging arm is attached to the lid so as to be able to swing, and the lid is arranged at a position displaced from the concave portion and extends parallel to a surface of the vehicle, when the lid is in the fully opening position, wherein the support arm includes an upper arm which is attached to an upper portion of the lid, and a lower arm which is attached to a lower portion of the lid and is independent from the upper arm, the upper arm and the lower arm respectively include the first swinging arm and the second swinging arm, the first swinging arm of the upper arm includes a plurality of engagement receiving portions which are formed along the first swinging arm and an engagement pin which is configured to be engaged with the engagement receiving portions, and the charging lid device further comprises a locking mechanism configured to engage the engagement pin with the engagement receiving portion to restrict an opening and closing operation of the lid.

* * * * *